United States Patent [19]
Koyama

[11] Patent Number: 4,878,141
[45] Date of Patent: Oct. 31, 1989

[54] SOLID-PHASE WELDED MAGNETIC HEAD

[75] Inventor: Masataka Koyama, Yokohama, Japan

[73] Assignee: Victor Company of Japan, Ltd., Japan

[21] Appl. No.: 228,679

[22] Filed: Aug. 5, 1988

Related U.S. Application Data

[62] Division of Ser. No. 802,952, Nov. 27, 1985, abandoned.

[30] Foreign Application Priority Data

Dec. 1, 1984 [JP] Japan ................................ 59-252829

[51] Int. Cl.⁴ ............................................. G11B 5/235
[52] U.S. Cl. ....................................... 360/120; 29/603
[58] Field of Search .................... 360/120, 125; 29/603

[56] References Cited

U.S. PATENT DOCUMENTS

| | | |
|---|---|---|
| 3,188,400 | 6/1965 | Vilensky . |
| 3,479,738 | 11/1969 | Hanak . |
| 3,639,701 | 2/1972 | Secrist et al. . |
| 4,017,966 | 4/1977 | Morell et al. . |
| 4,361,860 | 11/1982 | Nozawa . |
| 4,670,807 | 6/1987 | Gorter ................................. 360/120 |
| 4,675,988 | 6/1987 | Matsuzawa . |

FOREIGN PATENT DOCUMENTS

| | | |
|---|---|---|
| 2840604 | 4/1979 | Fed. Rep. of Germany . |
| 2539237 | 9/1981 | Fed. Rep. of Germany . |
| 3318196 | 11/1984 | Fed. Rep. of Germany . |

OTHER PUBLICATIONS

"Cation Diffusion coefficients and Vacancy Densities in Mn–Zn Ferrites", by Seiya Ogawa and Yasuaki Nakagawa, Journal of the Physical Society of Japan, vol. 23, No. 2, Aug., 1967, pp. 179–184.

Primary Examiner—A. J. Heinz
Attorney, Agent, or Firm—Lowe, Price, LeBlanc, Becker & Shur

[57] ABSTRACT

Disclosed is a magnetic head comprising first and second magnetic core halves held in abutment against each other and a gap-defining spacer interposed therebetween, and having an elongated tape-contact surface extending across said gap-defining spacer. The gap-defining spacer has the same crystal structure as that of said first and second core halves and is made of a non-magnetic material including the same principal component as those of said first and second cores halves. The gap-defining spacer is welded to said first and second core halves in accordance with a solid-phase welding method based on a solid-phase reaction.

4 Claims, 1 Drawing Sheet

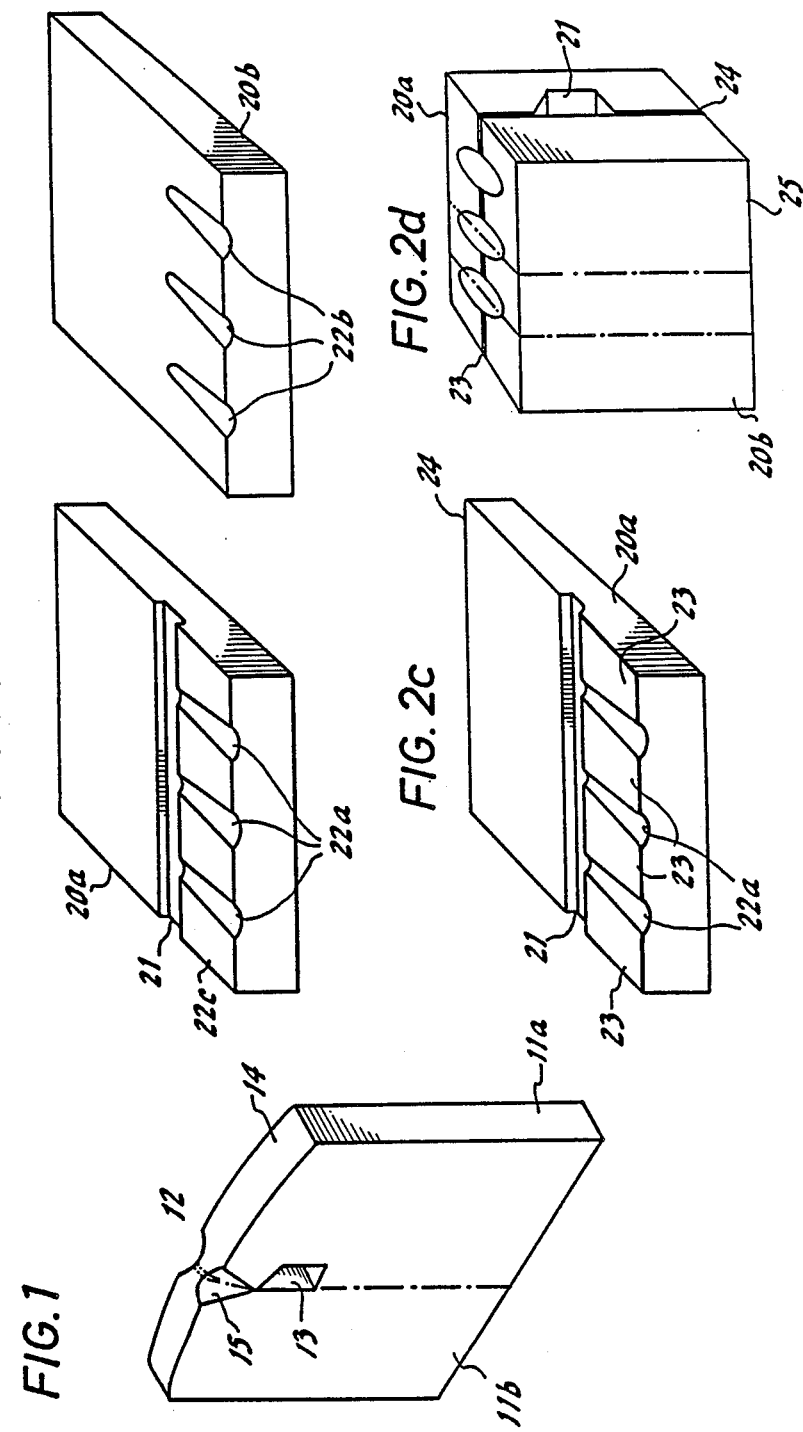

SOLID-PHASE WELDED MAGNETIC HEAD

This is a division of application Ser. No. 802,952, filed Nov. 27, 1985, now abandoned.

BACKGROUND OF THE INVENTION

The present invention relates generally to a magnetic head for magnetically recording and reproducing signals on and/or from a magnetic recording medium such as magnetic tape and a method for making such a magnetic head, wherein non-magnetic zinc ferrite is used as a gap-defining spacer material.

Various types of magnetic heads have been developed. Of these, a magnetic head in which glass bodies are used for defining a magnetic gap thereof is general which further includes first and second magnetic core halves each being made of, for example, Mn-Zn single crystal ferrite. The first and second magnetic core halves are held in abutment against each other so as to form the magnetic gap. The magnetic gap is occupied by a gap-defining spacer material such as $SiO_2$ so that it is sandwiched between the first and second core halves and the gap-defining spacer is welded to them by means of the glass-welding method.

However, according to the glass-welding method, the welding is performed using glass melted by heating to a temperature of about 700° C. with the result that the glass and $SiO_2$ diffuse and penetrate into the ferrite cores on the welding process. The diffusion and penetration result in a substantial increase in gap-length, worsening magnetic head performance, and further, the difference of coefficient of thermal expansion therebetween sometimes causes breakage of the magnetic head and deterioration of magnetic permeability.

On the other hand, Japanese Patent Provisional Publication No. 58-185437 discloses a magnetic head wherein non-magnetic zinc ferrite is employed as a gap-defining spacer material. This magnetic head not only eliminates the above-noted problems but also provides various advantages including increase in workability. However, the prior art magnetic head has a structure in which the gap-defining spacer is interposed between the magnetic core halves and bonded thereto by a bonding material. One problem with such a head structure is that there are difference in physical properties between the bonding material and the magnetic core halves or gap-defining spacer, thus resulting in the occurrence of strain between the spacer and magnetic cores and deterioration of magnetic characteristics. Furthermore, dispersion in wear resistance of the tape-contact surface thereof occurs at the joint portions between the gap-defining spacer and magnetic cores, thereby shortening the usable life time of the magnetic head because of a partial wear. Therefore, a further improvement will be required from a viewpoint of increase in durability of the magnetic head, preventing the magnetic characteristics from being deteriorated, and increase in running properties of the magnetic head.

SUMMARY OF THE INVENTION

It is accordingly an object of the present invention to provide a new and improved magnetic head which overcomes the above-described disadvantages inherent in the prior art magnetic heads.

It is a further object of the present invention to provide a method of producing such a magnetic head.

A feature of the present invention is that a gap-defining spacer interposed between first and second magnetic core halves has the same crystal structure as that of the first and second magnetic core halves and is made of a non-magnetic material including the same principal component as that of the magnetic core halves.

A further feature of the present invention is that the bonding between the gap-defining spacer and magnetic core halves is not performed using an adhesive material but is effected in accordance with the solid-phase welding method in which the weld is consummated by pressure or by heat and pressure without fusion on the basis of solid phase reaction.

These features of this invention provide advantages in that the welding surfaces of the gap-defining spacer are integrally welded to those of the magnetic core halves so that there is no apparent joint between the spacer and cores, and mechanical properties of the magnetic head are substantially equalized and thus dispersion of wear resistant properties on the tape-contact surface thereof is eliminated, with improved durability and running properties of the head and with no deterioration of magnetic properties caused by strain between the spacer and magnetic cores.

A method of fabricating a magnetic head of the present invention comprises the steps of providing first and second blocks of a magnetic material, each of the blocks having a mirror-finished surface, forming a slot in said mirror-finished surface of the first block in a longitudinal direction thereof, forming recesses in an upper side of said surface of the first block in a transverse direction from said slot to one end thereof, and forming recesses in the mirror-finished surface of the second block so as to be equal to those of the first block in shape and position. Thereafter, a gap-defining layer is provided on said upper side of the surface of the first block and further a magnetic layer, having a thickness equal to a thickness of the gap-defining layer, is provided on a lower side of the surface of the first block. The first and second blocks are joined together by faying the layers of the first block to the mirror-finished surface so that said recesses thereof face each other, and a solid-phase welding is then performed with respect to the fayed surfaces so that the first and second blocks are integrally welded to form a welded block. The welded block is cut along lines provided so as to cross the recesses and slot.

BRIEF DESCRIPTION OF THE DRAWINGS

The object and features of the present invention will become more readily apparent from the following detailed description of the preferred embodiment taken in conjunction with the accompanying drawings in which:

FIG. 1 is a perspective view of a magnetic head completed in accordance with the present invention; and FIGS. 2a through 2d are illustrations of the steps of fabricating a magnetic head according to the present invention.

DETAILED DESCRIPTION

Referring now to FIG. 1, there is illustrated a magnetic head according to the present invention. The magnetic head comprises a first magnetic core half 11a and a second magnetic core half 11b held in abutment with each other and a gap-defining spacer 12 interposed therebetween, and has an elongated tape-contact surface 14 formed thereby. The first magnetic core half 11a is U-shaped to form a coil winding slot 13. Each of the magnetic core halves 11a and 11b respectively has recesses 15 at the side of the tape-contact surface 14, recesses 15 being positioned at the both ends of the gap-defining spacer 12 exposed on the tape-contact surface 14 so as to define the gap width of the head.

The first and second core halves 11a and 11b are each made of a magnetic oxide material with spinel structure, whose principal component is iron oxide. For example, the core halves 11a and 11b are made of Mn-Zn single crystal ferrite consisting substantially of MnO (25 to 34 molar %), ZnO (14 to 19 molar %) and $Fe_2O_3$ (52 to 56 molar %). The gap-defining spacer 12 is made of nonmagnetic Zn (or Cd) single crystal ferrite material with spinel structure which has the same principal component as that of the magnetic oxide material. The non-magnetic Zn (or Cd) single crystal ferrite material consists of $Fe_2O_3$ and Zn (or CdO) at a molar ratio of 52 to 56:48 to 44 (99 wt %), CaO (0.5 wt %), and $Al_2O_3$ (0.5 wt %).

That is, the gap-defining spacer 12 is made of a nonmagnetic oxide material having the same crystal structure as that of the magnetic core halves 11a and 11b and comprising the same principal component as that of the magnetic cores. For example, $ZnFe_2O_4$ is employed as the principal component, and CaO not more than 0.5 wt % and $Al_2O_3$ of 0.5 to 2 wt % are added thereto. In this case, it is also appropriate to use MgO or a combination of CaO and MgO not more than 0.5 wt % in total amount in place of CaO.

The gap-defining spacer 12, as described above, is in sandwiching relation to the magnetic core halves 11a and 11b and both are integrally welded in accordance with the solid phase welding method on the basis of the solid phase reaction. A volume ratio of the gap-defining spacer 12 and the magnetic core half 11a or 11b is 1: infinity, and therefore both are integrally completely welded on the basis of the fact that the crystal structure of the spacer 12 is equalized in a direction of the crystal structure of the core whose volume is larger. As reported by Seiya Ogawa in "JOURNAL OF THE PHYSICAL SOCIETY OF JAPAN, vol. 23, No. 2 August, 1967", diffusion scarcely occurs in the solid phase reaction. Therefore, it will be seen from the report that diffusion from the spacer 12 to the cores 11a, 11b scarcely occurs in the solid-phase welding process. Even if diffusion occurs, since the gap spacer 12 is of the same crystal structure as those of the magnetic core halves 11a and 11b, the gap-length scarcely varies due to the solid phase welding. Furthermore, CaO, MgO or $Al_2O_3$ contained in the gap spacer material serves to prevent diffusion and penetration.

FIGS. 2a through 2d show a sequence of steps of fabricating a magnetic head according to the present invention. As illustrated in FIG. 2a, a first elongated block 20a made of a Mn-Zn ferrite magnetic material is provided which has a mirror-finished surface. The block 20a is machined such that a winding slot 21 is formed in the mirror-finished surface in a longitudinal direction thereof and recesses 22a for controlling a track width are formed in a transverse direction from the winding slot 21 to one end thereof. Furthermore, another block 20b, as shown in FIG. 2b, made of the same material as that of the block 20a and having the same shape as that of the block 20a are prepared. The block 20b is machined to form recesses 22b which are equal to the recesses 22a in shape and position. A gap-defining spacer layer 23 made of a non-magnetic oxide material consisting of $ZnFe_2O_4$, MgO and $Al_2O_3$ at a weight ratio of 99:0.5:0.5 is deposited by the sputtering method on the flat portions 22c of the upper side of the block 20a as shown in FIG. 2c. Here, the flat portions 22c are areas other than the recesses 22a on the upper side surface of the block 20a. The thickness of the spacer layer 23 deposited defines a gap length of the magnetic head. On the other hand, a thin layer 24 comprising the same magnetic material as those of the first and second blocks is provided by the sputtering method on the lower side surface of the block 20a facing through the winding slot 21 to the flat portions Thereafter, 30 to 40% of concentrated phosphoric acid liquid is applied to the layers 23, 24 of the first block 20a and to the mirror-finished surface of the second block 20b, and then the blocks 20a and 20b are joined together by faying the layers of the first block 20a to the surface of second block 20b so that the recesses 22a and 22b of the blocks 20a and 20b confront each other. The joined blocks 20a and 20b are welded by means of the solid-phase welding on the basis of the solid-phase reaction, thus forming a block 25 as shown in FIG. 2d. The solid-phase welding is achieved by keeping the fayed blocks 20a and 20b at a temperature between about 1250° C. and 1350° C. for about one hour in a nitrogen atmosphere of the oxygen partial pressure (5 molar %) in equilibrium with the content of oxygen in the Mn-Zn ferrite.

The block 25 is cut along dot-and-dash lines indicated in FIG. 2d across the recesses 22a and 22b and the joint between the blocks 20a and 20b, thereby providing magnetic head blanks. Each of the magnetic head blanks is grounded to form a magnetic head as shown in FIG. 1.

It should be understood that the foregoing relates to only a preferred embodiment of the invention, and that it is intended to cover all changes and modifications of the embodiment of the invention herein used for the purpose of the disclosure, which do not constitute departures from the spirit and the scope of the invention. For example, although in the foregoing description a Mn-Zn single crystal ferrite magnetic material is used as the material for making the block 20a and 20b, it is also possible to use a polycrystal ferrite magnetic material for the block 20a and/or the block 20b.

What is claimed is:

1. A magnetic head comprising first and second magnetic core halves held in abutment against each other and a gag-defining spacer interposed therebetween, and having an elongated tape-contact surface extending across said gap-defining spacer, said gap-defining spacer being formed of a material having substantially the same crystal structure as the material forming said first and second core halves said gap-defining spacer being solid-phase welded to said first and second core halves based on a solid-phase reaction.

2. A magnetic head as claimed in claim 1, wherein said gap-defining spacer containing at least $Al_2O_3$, CaO or a mixture thereof.

3. The magnetic head of claim 1, wherein said gap-defining spacer is made of a non-magnetic material having as a major component therein the same major component as that of said first and second core halves.

4. The magnetic head of claim 3, wherein said major component is zinc ferrite.

* * * * *